US008490641B2

(12) United States Patent
Schnittger et al.

(10) Patent No.: US 8,490,641 B2
(45) Date of Patent: Jul. 23, 2013

(54) COMPRESSED AIR SUPPLY SYSTEM FOR A COMMERCIAL VEHICLE AND METHOD FOR OPERATING SAID COMPRESSED AIR SUPPLY SYSTEM

(75) Inventors: Karsten Schnittger, Munich (DE); Thomas Ertl, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 374 days.

(21) Appl. No.: 12/562,851

(22) Filed: Sep. 18, 2009

(65) Prior Publication Data

US 2010/0074764 A1    Mar. 25, 2010

Related U.S. Application Data

(63) Continuation of application No. PCT/EP2008/002132, filed on Mar. 18, 2008.

(30) Foreign Application Priority Data

Mar. 19, 2007 (DE) .......................... 10 2007 013 673

(51) Int. Cl.
*F16K 11/22* (2006.01)
*F16K 11/24* (2006.01)
*B60T 17/04* (2006.01)
*B60T 13/68* (2006.01)
*B60T 13/70* (2006.01)

(52) U.S. Cl.
USPC .................. 137/115.25; 137/544; 251/30.01; 303/15

(58) Field of Classification Search
USPC ..... 137/115.25, 597, 544; 251/30.01; 303/13, 303/15
See application file for complete search history.

(56) References Cited

U.S. PATENT DOCUMENTS 5,163,353 A * 11/1992 Horstmann et al. ............ 91/426
5,884,895 A *  3/1999 Wolz et al. ..................... 251/54

(Continued)

FOREIGN PATENT DOCUMENTS

DE    195 15 895 A1   10/1996
DE    198 35 638 A1    2/2000

(Continued)

OTHER PUBLICATIONS

International Search Report dated Sep. 10, 2008 w/English translation (four (4) pages).

(Continued)

*Primary Examiner* — Craig Schneider
*Assistant Examiner* — Atif Chaudry
(74) *Attorney, Agent, or Firm* — Crowell & Moring LLP (57) ABSTRACT

A compressed air supply system for a utility vehicle includes a compressed air inlet that can be coupled to a compressor, a filter unit that can be coupled to the compressed air inlet via a supply line, a discharge valve element that is coupled to a discharge outlet and the supply line, an energy-saving control outlet that can be coupled to a control inlet of the compressor, a supply line locking valve element interposed between the compressor and the filter unit and a first valve element and a second valve element, the discharge valve element, the energy saving control outlet, the regeneration of the filter unit and the supply line locking valve element being controllable by the valve elements. The energy saving control outlet can be controlled by the first valve element and the discharge valve element and the regeneration of the filter unit can be controlled by the second valve element. The supply line locking valve element is closed during the regeneration phase of the filter unit and can be transferred into an opened switching state when not in the regeneration state and when the discharge valve element is closed and the energy saving control outlet is aerated.

39 Claims, 2 Drawing Sheets

U.S. PATENT DOCUMENTS

| | | | |
|---|---|---|---|
| 6,089,831 A | | 7/2000 | Bruehmann et al. |
| 6,332,623 B1 * | | 12/2001 | Behmenburg et al. ... 280/124.16 |
| 7,946,660 B2 * | | 5/2011 | Diekmeyer et al. ............... 303/3 |
| 2007/0246998 A1 * | | 10/2007 | Diekmeyer et al. .......... 303/9.61 |

FOREIGN PATENT DOCUMENTS

| | | |
|---|---|---|
| DE | 103 23 037 A1 | 12/2004 |
| DE | 10 2005 057 004 B3 | 4/2007 |
| EP | 808756 A1 * | 11/1997 |
| EP | 1 318 936 B1 | 6/2003 |
| EP | 1 479 584 B1 | 11/2004 |

OTHER PUBLICATIONS

German Search Report dated Oct. 23, 2008 w/English translation (nine (9) pages).

* cited by examiner

COMPRESSED AIR SUPPLY SYSTEM FOR A COMMERCIAL VEHICLE AND METHOD FOR OPERATING SAID COMPRESSED AIR SUPPLY SYSTEM

CROSS-REFERENCE TO RELATED APPLICATIONS

This application is a continuation of PCT International Application No. PCT/EP2008/002132, filed Mar. 18, 2008, which claims priority under 35 U.S.C. §119 to German Patent Application No. DE 10 2007 013 673.2, filed Mar. 19, 2007, the entire disclosures of which are herein expressly incorporated by reference.

This application contains subject matter related to U.S. patent application Ser. No. 12/562,810, entitled "Compressed Air Supply System for a Commercial Vehicle and Method for Operating a Compressed Air Supply System," and U.S. application Ser. No. 12/562,547, entitled "Compressed Air Supply System for a Commercial Vehicle, and Method for Operating a Compressed Air Supply System," both filed on even date herewith.

BACKGROUND AND SUMMARY OF THE INVENTION

The invention relates to a compressed air supply system for a commercial vehicle. The system includes a compressed air inlet that can be coupled to a compressor, a filter unit that is coupled to the compressed air inlet via a delivery line, a discharge valve element that is coupled to a discharge outlet and the delivery line, an energy saving control outlet that can be coupled to a control inlet of the compressor, a delivery line shut-off valve element interposed between the compressor and the filter unit and a first valve element and a second valve element. The discharge valve element, the energy saving control outlet, the regeneration of the filter unit and the delivery line shut-off valve element are controllable by the valve elements.

The invention furthermore relates to a method for operating a compressed air supply system. The system including a compressed air inlet that can be coupled to a compressor, a filter unit that is coupled to the compressed air inlet via a delivery line, a discharge valve element that is coupled to a discharge outlet and the delivery line, an energy saving control outlet that can be coupled to a control inlet of the compressor, a delivery line shut-off valve element interposed between the compressor and the filter unit and a first valve element and a second valve element, provision being made, within the scope of the method, for the discharge valve element, the energy saving control outlet, the regeneration of the filter unit and the delivery line shut-off valve element to be controlled by the valve elements.

In utility or commercial vehicles, compressed air supply systems of this kind perform numerous functions. These include, especially, supplying the brake system and other compressed air consumers with dry, cleaned compressed air, providing a multi-circuit protection valve function to safeguard various consumer circuits from one another, to ensure a particular filling sequence and to provide a pressure regulator function. The compressed air used by the compressed air consumers is supplied primarily by a compressor, which is generally driven by the internal combustion engine of the utility vehicle. In many systems, the compressor can be transferred to an energy saving state, either by opening a clutch via which the compressor can be coupled to the internal combustion engine, or by pneumatic activation of a compressor control inlet in order to transfer the compressor to an idling state. Energy saving measures of this kind can also be assisted by ensuring that the operating sequences in the compressed air supply system take place as far as possible in such a way that compressed air, once produced, is not lost unnecessarily. At the same time, it should be noted that a certain loss of compressed air is unavoidable since the filter unit of the compressed air supply system must be repeatedly regenerated. For this purpose, dry compressed air from the compressed air tanks connected to the compressed air supply system is passed through the filter unit in the opposite direction to the direction of delivery. The air flowing through the filter unit at least partially absorbs the moisture in the filter unit and then flows out into the open via the discharge valve of the compressed air supply system.

In certain prior-art systems, provision is made to couple the energy saving operating state to the opening of the discharge valve, that is to say whenever the compressor is transferred to an energy saving state the discharge valve is opened too, resulting in an unnecessary loss of pressure in the entire delivery line ahead of a check valve facing the consuming units, which is arranged downstream of the filter unit.

EP 1 318 936 B1 describes a compressed air supply system provided with a regeneration function and an energy saving outlet to transfer a compressor to an idling state. Two solenoid valves are provided to provide these functions. Here, provision is made for the opening of the regeneration air path to be coupled to the opening of the discharge valve. In this way, the compressed air from the volume between the discharge valve and a check valve facing the consuming units, which is arranged downstream of the filter unit, is lost only if this is inevitable owing to the required regeneration. However, no measures are taken to conserve the compressed air in a delivery line between the compressor and the compressed air supply system during the regeneration phases. If this could be achieved by means of an elegant piece of circuit engineering, there would be an additional way of saving compressed air and hence energy.

The object on which the invention is based is to provide a compressed air supply system and an operating method which have a high potential for saving energy and exhibit an increase in functionality over the prior art.

The invention builds on the generic compressed air supply system in that the energy saving control outlet can be controlled by the first valve element, and the discharge valve element and the regeneration of the filter unit can be controlled by the second valve element, and in that the delivery line shut-off valve element is closed during the regeneration phase of the filter unit and can be transferred to an opened control state when not in the regeneration phase and when the discharge valve element is closed and the energy saving control outlet is supplied with air. Shutting off the line between the compressor and the filter unit by means of the delivery line shut-off valve element during the regeneration phase has the effect that the volume of compressed air between the compressor and the delivery line shut-off valve element is not lost during regeneration. Thus, essentially, the only compressed air which is lost to the atmosphere is that which is actually needed for regeneration and has flowed through the filter unit for this purpose. Outside the regeneration phase, it is possible, in particular, for there to be two different operating states of the compressed air supply system, namely the operating state for delivery and a state in which neither regeneration nor delivery takes place. In the last-mentioned phase, it is useful to transfer the delivery line shut-off valve element at least temporarily to an open control state in order in this way to prevent the delivery line and/or the delivery line shut-off valve element from freezing at low temperatures. This possibility is provided by the present invention.

In particular, it is envisaged that, in a first control state, the first valve element vents the energy saving control outlet, and, in a second control state, supplies the energy saving control outlet with air, and in that a compressor coupled to the energy saving control outlet can be transferred to an energy saving state by supplying the energy saving control outlet with air. The first valve element is thus provided exclusively for controlling the compressor.

In the context of the abovementioned configuration with regard to the first valve element it is envisaged, in particular, that, in a first control state, the second valve element vents a control inlet of the discharge valve element and a control inlet of the delivery line shut-off valve element, and blocks a regeneration air path, and, in a second control state, supplies air to the control inlet of the discharge valve element and the control inlet of the delivery line shut-off valve element and opens the regeneration air path, and that the discharge valve element is closed when the control inlet is vented and open when the control inlet is supplied with air, and the delivery line shut-off valve element is open when the control inlet is vented and closed when the control inlet is supplied with air. The second valve element thus operates both the discharge valve element and the delivery line shut-off valve element. Moreover, the regeneration air path is opened or blocked. This is possible because the discharge valve must always be open during regeneration and the delivery line should always be shut off to conserve compressed air. Activation of these components with a single valve element, namely the second valve element, is thus particularly economical.

It is useful if, in a first operating state of the compressed air supply system, the first valve element assumes its first control state and the second valve element assumes its first control state, resulting in an operating state for delivery. The discharge valve is closed, the regeneration path is blocked, the delivery line shut-off valve element is open and the compressor delivers. A pressure build-up thus takes place in the compressed air supply system.

It is furthermore envisaged that, in a second operating state of the compressed air supply system, the first valve element assumes its second control state and the second valve element assumes its second control state, resulting in an operating state for regeneration. With the regeneration path opened, the discharge valve element opened, the delivery line shut-off valve element closed and a compressor in the energy saving state, it is possible to carry out regeneration with an advantageous saving of energy, the energy saving being achieved, on the one hand, by the switching of the compressor to the idling phase and, on the other hand, by the conservation of the volume of compressed air in the delivery line.

It is furthermore preferred that, in a third operating state of the compressed air supply system, the first valve element assumes its second control state and the second valve element assumes its first control state, resulting in a blocking operating state with an open delivery line shut-off valve element. The shut-off valve is closed and the compressor is in its idling state. Regeneration does not take place during this blocking operating state. However, it is ensured that the delivery line shut-off valve element is open in order to prevent freezing of this element at low temperatures, and of the delivery line connected thereto.

According to a further embodiment of the present invention, it is envisaged that, in a first control state, the first valve element vents the energy saving control outlet, and vents a first control inlet of the delivery line shut-off valve element, and, in a second control state, supplies the energy saving control outlet with air and supplies the first control inlet of the delivery line shut-off valve element with air, and that a compressor coupled to the energy saving control outlet can be transferred to an energy saving state by supplying the energy saving control outlet with air, and the delivery line shut-off valve element is open when the first control inlet is vented and is closed under certain conditions when the first control inlet is supplied with air. In contrast to the embodiment described above, the first valve device now operates not only the energy saving control outlet but also the delivery line shut-off valve element.

In this case, it is useful if, in a first control state, the second valve element vents a control inlet of the discharge valve element and blocks a regeneration air path, and, in a second control state, supplies the control inlet of the discharge valve element with air and opens the regeneration air path, and if the discharge valve element is closed when the control inlet is vented and is opened when the control inlet is supplied with air. Since the first valve element actuates the delivery line shut-off valve element, it is sufficient that the second valve element should open and block the regeneration path and actuate the discharge valve.

It is useful if, in a first operating state of the compressed air supply system, the first valve element assumes its first control state and the second valve element assumes its first control state, resulting in an operating state for delivery. The discharge valve is closed, the delivery line shut-off valve element is opened, the regeneration path is opened and the compressor delivers.

Another possibility is one in which, in a second operating state of the compressed air supply system, the first valve element assumes its second control state and the second valve element assumes its second control state, resulting in an operating state for regeneration. The regeneration path is opened and the discharge valve is open. The compressor is in the idling state and the delivery line shut-off valve element is closed.

Another possibility is one in which, in a third operating state of the compressed air supply system, the first valve element assumes its second control state and the second valve element assumes its first control state, resulting in a blocking operating state. Outside the regeneration phase, the discharge valve remains closed, and the compressor can operate in its idling state if there is no requirement for compressed air.

A useful possibility in connection with this blocking operating state is one in which a third valve element is provided which, in a first control state, vents a second control inlet of the delivery line shut-off valve element and, in a second control state, supplies the second control inlet of the delivery line shut-off valve element with air, and in which the delivery line shut-off valve element is open when the second control inlet is supplied with air, even if the first control inlet of the delivery line shut-off valve element is supplied with air, with the result that, in the case of a third valve element, the system is in the blocking operating state with the delivery line shut-off valve element closed in the first control state and open in the second control state. The third valve element thus determines whether the delivery line shut-off valve element is open or closed in the blocking operating state, that is to say when the discharge valve is closed and the compressor is not delivering. Since the opening of the delivery line shut-off valve element is intended to prevent freezing of the valve element and of the connected line, it is possible to dispense with such opening, for example, when the temperatures are sufficiently high.

It is furthermore preferred if, in a fourth operating state of the compressed air supply system, the first valve element assumes its first control state and the second valve element assumes its second control state, resulting in an operating state for purging. In this operating state, the discharge valve element and the delivery line shut-off valve element are open in the delivery phase of the compressor. As a consequence, air can be delivered directly from the compressor to the discharge point of the compressed air supply system.

It is useful to provide for the third valve element to be coupled to a control line, via which further control functions can be implemented in the compressed air supply system. In accordance with the above embodiments, the third valve element is provided to close the delivery line shut-off valve element when required. Since this will only be necessary in certain operating states of the compressed air supply system, the compressed air to be controlled by the third valve element can also be used for other functions without impairing the energy saving functions described.

By way of example, provision can be made for the control line to be connected to a control inlet of an overflow valve which supplies a consumer circuit. The overflow valves of the compressed air supply system form a multi-circuit protection valve element which, on the basis of the opening and closing pressures assigned to the overflow valves, ensures a certain filling sequence and safeguarding of the individual consumer circuits from one another. Since an overflow valve of this kind can now be activated by the third valve element, it is possible to exert a direct influence on the functionality of the multi-circuit protection valve.

In this context, provision can be made for opening of the overflow valve to be assisted by supplying air to the control inlet. This enables a consumer circuit that is per se to be filled with a low priority to be filled preferentially in a selective manner. In particular, the circuit concerned can be the compressed air circuit assigned to the pneumatic suspension system of the vehicle or some other circuit which can be filled without sacrificing safety even when the available brake pressure is still inadequate. It is likewise possible to keep the overflow valves connected to the control line permanently open, thereby avoiding closure of the overflow valves when the pressure falls below the closing pressure.

According to another concept, a closed state of the overflow valve can be brought about and maintained by supplying air to the control inlet. This makes it possible, in particular, to separate a faulty circuit from the other circuits, making it possible to continue operating the compressed air system in the range of its optimum operating pressures without said system losing pressure via the faulty circuit.

It is useful if the valve elements are 3/2-way valves. This makes it possible to provide the connections and control states required for the functionalities described.

In particular, provision can be made for an electronic control unit to be provided, and for the valve elements to be solenoid valves. In this way, the various operating states of the compressed air supply system can be adopted on the basis of intelligent calculations, it being possible, in particular, to take into account numerous items of information relating to the utility vehicle. These can be made available directly or via a data bus to the electronic control unit, it being possible, in particular, for various control units of the utility vehicle to be connected to a data bus in order in this way to exchange information with the control unit of the compressed air supply system.

Provision can furthermore be made for the discharge valve element to be a 2/2-way valve. It is likewise useful for the delivery line shut-off valve element to be a 2/2-way valve.

The invention builds on the method of the generic type by means of a method in which the energy saving control outlet is controlled by the first valve element, and the discharge valve element and the regeneration of the filter unit are controlled by the second valve element, and in which the delivery line shut-off valve element is closed during the regeneration phase of the filter unit and is transferred to an opened control state when not in the regeneration phase and when the discharge valve element is closed and the energy saving control outlet is supplied with air. In this way, the advantages and special features of the compressed air supply system according to the invention are also utilized in the context of a method. This also applies to the particularly preferred embodiments of the method according to the invention which are given below.

In a useful development of said method, the first valve element vents the energy saving control outlet in a first control state and supplies the energy saving control outlet with air in a second control state, and a compressor coupled to the energy saving control outlet can be transferred to an energy saving state by supplying the energy saving control outlet with air.

Another possibility is that, in a first control state, the second valve element vents a control inlet of the discharge valve element and a control inlet of the delivery line shut-off valve element and blocks a regeneration air path and, in a second control state, supplies the control inlet of the discharge valve element and the control inlet of the delivery line shut-off valve element with air and opens the regeneration air path, and that the discharge valve element is closed when the control inlet is vented and is opened when the control inlet is supplied with air, and the delivery line shut-off valve element is opened when the control inlet is vented and closed when the control inlet is supplied with air.

It is preferred that, in a first operating state of the compressed air supply system, the first valve element assumes its first control state and the second valve element assumes its first control state, resulting in an on-load operating state.

It is furthermore preferred that, in a second operating state of the compressed air supply system, the first valve element assumes its second control state and the second valve element assumes its second control state, resulting in an operating state for regeneration.

It is furthermore useful if, in a third operating state of the compressed air supply system, the first valve element assumes its second control state and the second valve element assumes its first control state, resulting in a blocking operating state with the delivery line shut-off valve element open.

According to another embodiment of the method according to the invention, in a first control state, the first valve element vents the energy saving control outlet, and vents a first control inlet of the delivery line shut-off valve element, and, in a second control state, supplies the energy saving control outlet with air and supplies the first control inlet of the delivery line shut-off valve element with air, and a compressor coupled to the energy saving control outlet can be transferred to an energy saving state by supplying the energy saving control outlet with air, and the delivery line shut-off valve element is open when the first control inlet is vented and is closed under certain conditions when the first control inlet is supplied with air.

In this context, it is useful if, in a first control state, the second valve element vents a control inlet of the discharge valve element and blocks a regeneration air path, and, in a second control state, supplies the control inlet of the discharge valve element with air and opens the regeneration air path, and in that the discharge valve element is closed when the control inlet is vented and is opened when the control inlet is supplied with air.

It is furthermore provided that, in a first operating state of the compressed air supply system, the first valve element assumes its first control state and the second valve element assumes its first control state, resulting in an operating state for delivery.

It is furthermore preferred if, in a second operating state of the compressed air supply system, the first valve element assumes its second control state and the second valve element assumes its second control state, resulting in an operating state for regeneration.

It is also preferred if, in a third operating state of the compressed air supply system, the first valve element assumes its second control state and the second valve element assumes its first control state, resulting in a blocking operating state.

It is furthermore advantageous that a third valve element is provided which, in a first control state, vents a second control inlet of the delivery line shut-off valve element and, in a second control state, supplies the second control inlet of the delivery line shut-off valve element with air, and that the delivery line shut-off valve element is open when the second control inlet is supplied with air, even if the first control inlet of the delivery line shut-off valve element is supplied with air, with the result that, in the case of a third valve element, the system is in the blocking operating state with the delivery line shut-off valve element closed in the first control state and open in the second control state.

The invention can furthermore be configured in such a way that, in a fourth operating state of the compressed air supply system, the first valve element assumes its first control state and the second valve element assumes its second control state, resulting in an operating state for purging.

Provision can furthermore been made for the third valve element to be coupled to a control line, via which further control functions can be implemented in the compressed air supply system.

The method according to the invention is advantageously developed if the control line is connected to a control inlet of an overflow valve which supplies a consumer circuit. It is furthermore useful that opening of the overflow valve is assisted by supplying air to the control inlet. Provision can also be made for a closed state of the overflow valve to be brought about and maintained by supplying air to the control inlet.

It is furthermore advantageous that the valve elements are activated by an electronic control unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
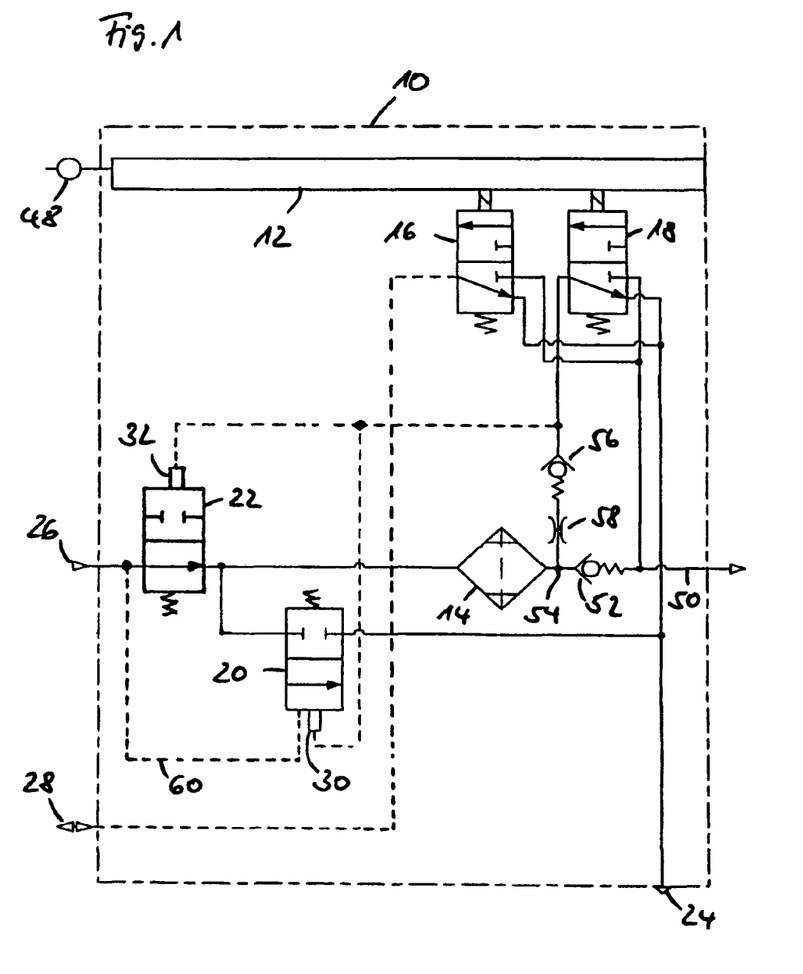
FIG. 1 shows a schematic partial representation of a first embodiment of a compressed air supply system according to the invention.

FIG. 1 shows a schematic partial representation of a first embodiment of a compressed air supply system according to the invention. The compressed air supply system 10 contains an electronic control unit 12. The control unit 12 is provided with an electrical interface 48 for the purpose of energy supply and for exchanging signals with other vehicle components. The electronic control unit 12 can be used to activate two 3/2-way solenoid valves 16, 18. Other components, for example a heating system, pressure sensors and further solenoid valves, which can be provided in conjunction with the electronic control unit 12, are not shown. The compressed air supply system has a compressed air inlet 26, which can be coupled to a compressor, and a discharge outlet 24. A discharge valve 20 is interposed between the compressed air inlet 26 and the discharge outlet 24. Also connected to the compressed air inlet 26 is a filter unit 14. Via this filter unit 14, the compressed air supplied to the compressed air inlet 26 is passed to the consumer circuits, a check valve 52 being provided on this path to prevent compressed air from flowing back out of the consumer circuits. The supply to the consumer circuits from the line coupled to the check valve 52 generally takes place via a multi-circuit protection valve element (not shown here) incorporated into the compressed air supply system. The compressed air supply system 10 furthermore has an energy saving control outlet 28, to which a control inlet of the compressor coupled to the compressed air inlet 26 can be connected.

The components mentioned and other components are connected up as follows. The solenoid valve 16 is connected to a supply line 50 downstream of the check valve 52, to the discharge outlet 24 and to the energy saving control outlet 28. The solenoid valve 18 is likewise connected to the supply line 50 and the discharge outlet 24. There is another connection to a line section 54 between the filter unit 14 and the check valve 52, a check valve 56 and a restrictor 58 being connected in series between the second solenoid valve 18 and line section 54. To this extent, the solenoid valve 18 is part of a compressed air conduit which bypasses the check valve 52 and may be referred to as a regeneration air path. That connection of the solenoid valve 18 which is connected to the check valve 56 is furthermore connected to a control inlet 32 of the delivery line shut-off valve 22 and to a control inlet 30 of the discharge valve 20. A further control line 60 connects the discharge valve 20 to the compressed air inlet 26, and the discharge valve 20 thus also acts as a pressure relief valve. As an alternative, a separate pressure relief valve can be provided. It is likewise possible to connect the control line 60 to the delivery line downstream of the delivery line shut-off valve 22.

As explained above, the solenoid valves 16, 18 are connected to the supply line 50 directly downstream of the check valve 52. This is an illustrative embodiment. It is likewise possible to supply the solenoid valves 16, 18 from a pressure line which lies downstream of overflow valves. This can be a matter of supply directly from the consumer circuits. If certain consumer circuits are supplied serially from consumer circuits positioned ahead of them, a further overflow valve being provided between the consumer circuits positioned ahead and the consumer circuits positioned after them, the valve elements 16, 18 can also be supplied from the line section between the circuits positioned ahead and the overflow valves of the circuits positioned after them.

In the de-energized state, the solenoid valves 16, 18 are in their illustrated control states, while they can be switched against return forces by selective energization.

If both solenoid valves 16, 18 are de-energized, the regeneration air path is closed owing to the control position of the second solenoid valve 18. This control position also results in venting of the control inlet 32 of the delivery line shut-off valve 22 and venting of the control inlet 30 of the discharge valve 20. The de-energized control position of the first solenoid valve 16 brings about venting of the energy saving control outlet, with the result that the compressor delivers. With the compressor delivering, the delivery line shut-off valve open, the discharge valve closed and the regeneration air path blocked, the system is in a delivery phase overall.

If both solenoid valves 16, 18 are energized, the regeneration air path is opened owing to the switching of solenoid valve 18. The shut-off valve 20 is likewise opened by supplying air to its control inlet 30, and the delivery line shut-off valve 22 is closed by supplying air to the control inlet 32. The result is thus a flow of air from the supply line 50 to the discharge outlet 24 via the second solenoid valve 18, the check valve 56, the restrictor 58, the filter unit 14 and the discharge valve 20. This is a regeneration phase.

If the first solenoid valve 16 is energized while the second solenoid valve 18 is de-energized, what is referred to as a blocking operating state is present. Owing to the supply of air to the energy saving control outlet 28, the compressor is not delivering, and the regeneration path and the discharge valve 20 are closed. At the same time, the delivery line shut-off valve 22 is open, preventing this delivery line shut-off valve 22 and the delivery line freezing. As depicted in FIG. 1, the 3/2-way solenoid valve is part of the regeneration air path. Provision can likewise be made, by means of a solenoid valve of this kind or similar, for another valve, which can then be designed as a 2/2-way valve, to be activated, this then being part of the regeneration air path.

Figure 2:
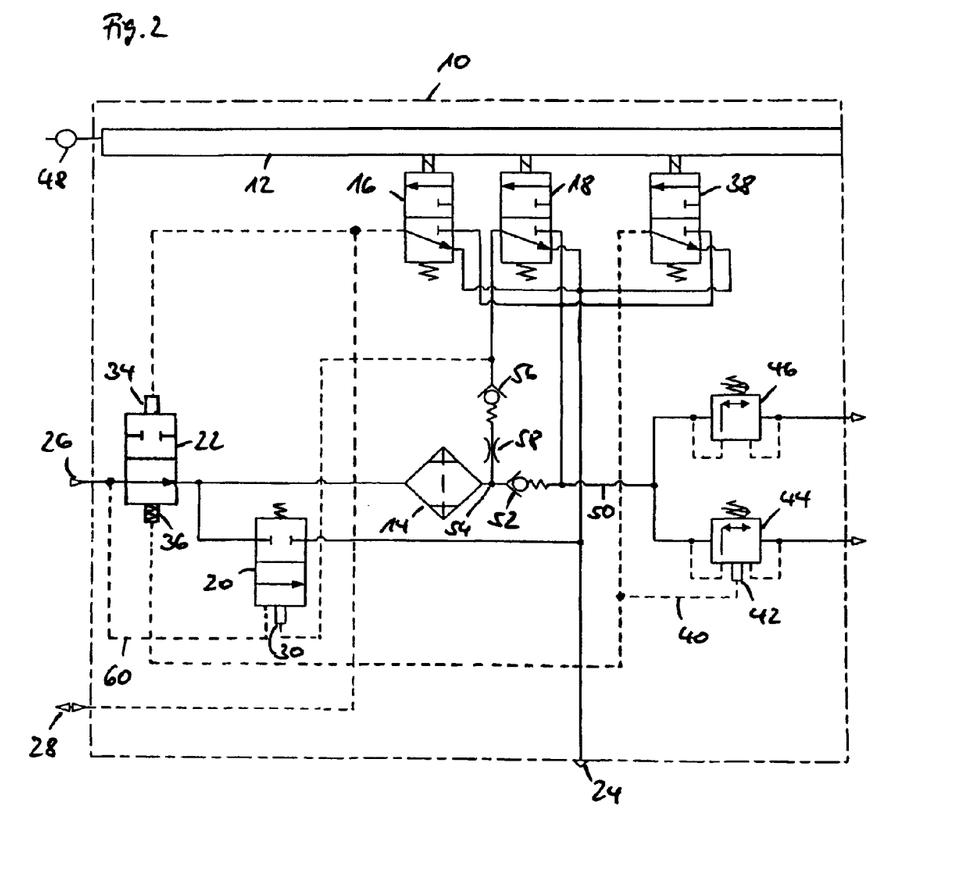
FIG. 2 shows a schematic partial representation of a second embodiment of a compressed air supply system according to the invention.

FIG. 2 shows a schematic partial representation of a second embodiment of a compressed air supply system according to the invention. The embodiment in FIG. 2 has numerous features in common with that in FIG. 1, and reference can thus be made in this regard to the description of FIG. 1. There are differences with regard to the design of the delivery line shut-off valve unit 22, in the way the solenoid valves 16, 18 are connected up in relation to the other components, and in that a further valve element 38, which can be activated by the control unit 12 and is designed as a 3/2-way solenoid valve, participates in the control of the operating states of the compressed air supply system 10. Also illustrated are two overflow valves 44, 46, via which consumer circuits are supplied with compressed air. Further overflow valves can be provided in parallel with the overflow valves 44, 46. It is likewise possible to connect further overflow valves in series with at least one of the overflow valves 44, 46 illustrated and, by this means, to serially supply downstream consumer circuits with likewise downstream overflow valves.

The first solenoid valve 16 is connected to a first control inlet 34 of the delivery line shut-off valve 22, which is fitted with two control inlets 34, 36. There is a further connection to the energy saving control outlet 28. The other connections of the first solenoid valve 16 are again connected to the supply line 50 or the discharge outlet 24, and again it holds true with respect to supply, that said supply can also be effected from a point downstream with respect to one or more of the illustratively depicted overflow valves 44, 46. As in connection with FIG. 1, the solenoid valve 18 can be part of the regeneration air path. It is furthermore connected to the control inlet 30 of the discharge valve 20. Like the first solenoid valve 16 and the second solenoid valve 18, the third solenoid valve 38 is connected to the compressed air supply and the vent. The remaining connection of the solenoid valve 38 leads to a second control inlet 36 of the delivery line shut-off valve 22, the second control inlet 36 being prioritized over the first control inlet 34. This means that, when the pressure at the two control inlets 34, 36 is equal, the delivery line shut-off valve 22 is switched into the position that it also assumes when the first control inlet 34 is vented. A further control line 40 is connected to the third solenoid valve 38 and said control line leads to a control inlet 42 of an overflow valve 44. This overflow valve 44 and the further overflow valve 46 illustrated have defined opening and closing pressures, ensuring that a filling sequence is maintained and the consumer circuits are safeguarded relative to one another. However, if air is supplied to the control inlet 42 of the overflow valve 44, the overflow valve 44 is opened irrespective of the applied pressure from the supply line 50, or is held in its open state. As a consequence, one consumer circuit can be selectively filled by switching the solenoid valve 38. In principle, the reverse variant is also conceivable, namely an overflow valve with a control inlet which assists the closing process of the overflow valve. In this case, particular consumer circuits can be decoupled selectively from the rest of the compressed air supply system 10.

With regard to the description which follows of the various control states described with respect to regeneration and the energy saving demanded, control line 40 is optional and it is thus also possible for it to be omitted. Given this situation, the following description does not take into account the effect brought about by control line 40.

In the de-energized state, the solenoid valves 16, 18, 38 are in their illustrated control states, but they can be switched over against return forces by selective energization.

If the solenoid valves 16, 18 are de-energized, the regeneration air path is closed and the control inlet 30 of the discharge valve 20 is vented. In this situation, the discharge valve is closed. Owing to the control position of the first solenoid valve 16, the first control inlet 34 of the delivery line shut-off valve 22 is likewise vented, with the result that the delivery line shut-off valve 22 is open, irrespective of the control position of the third solenoid valve 38. The energy saving control outlet 28 continues to be vented via the first solenoid valve 16. As a consequence, the system is in an operating state for delivery.

If the solenoid valves 16, 18 are energized while the third solenoid valve 38 remains in its de-energized state, the regeneration air path is opened by the second solenoid valve 18, and the control inlet 30 of the discharge valve 20 is supplied with air. As a consequence, the discharge valve 20 opens. By means of the first solenoid valve 16, the energy saving control outlet 28 is supplied with air, causing the compressor to switch to its idling state. The first control inlet 34 of the delivery line shut-off valve 22 continues to be supplied with air, while the second control inlet 36 of the delivery line shut-off valve is vented owing to the de-energized state of the third solenoid valve 38. As a consequence, the delivery line shut-off valve closes. The system is in a regeneration state.

If the first solenoid valve 16 is energized, while the second solenoid valve 18 remains in its de-energized state, the regeneration air path is blocked, but the compressor is nevertheless in its idling phase because the energy saving control outlet 28 is vented. Because the control inlet 30 is vented, the discharge valve 20 is closed. As a consequence, the system is in a blocking operating state. This can take two forms, depending on the control position of the third solenoid valve 38. If said solenoid valve is de-energized, the second control inlet 36 of the delivery line shut-off valve 22 is vented, with the result that the delivery line shut-off valve 22 is closed owing to the first control inlet 34 being supplied with air. However, if the third solenoid valve 38 is energized, both control inlets 34, 36 of the delivery line shut-off valve 22 are supplied with air. Owing to the prioritization of the second control inlet 36 over the first control inlet 34, this leads to opening of the delivery line shut-off valve 22. The blocking operating state can thus be achieved either with the delivery line shut-off valve 22 open or closed.

A further operating state of the compressed air supply system 10 illustrated in FIG. 2 is again independent of the control position of the third solenoid valve 38. If the first solenoid valve 16 is de-energized while the second solenoid valve 18 is energized, the regeneration air path is opened and the discharge valve 20 is open owing to the control inlet 30 being supplied with air. The delivery line shut-off valve 22 is likewise open owing to the first control inlet 34 being vented, and the compressor delivers owing to the energy saving control outlet 28 being vented. In this situation, the compressor delivers compressed air directly to the discharge outlet 24 via the delivery line shut-off valve 22 and the discharge valve 20. The operating state is thus one of purging.

The features of the invention which are disclosed in the above description, in the drawings and in the claims can be essential to the implementation of the invention both individually and in any combination.

| Table of Reference Numerals | |
|---|---|
| 10 | Compressed air supply system |
| 12 | Control unit |
| 14 | Filter unit |
| 16 | Valve element |
| 18 | Valve element |
| 20 | Discharge valve |
| 22 | Delivery line shut-off valve element |
| 24 | Discharge outlet |
| 26 | Compressed air inlet |
| 28 | Energy saving control outlet |
| 30 | Control inlet |
| 32 | Control inlet |
| 34 | Control inlet |
| 36 | Control inlet |
| 38 | Valve element |
| 40 | Control line |
| 42 | Control inlet |
| 44 | Overflow valve |
| 46 | Overflow valve |
| 48 | Interface |
| 50 | Supply line |
| 52 | Check valve |
| 54 | Line section |
| 56 | Check valve |
| 58 | Restrictor |
| 60 | Control line |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air supply system for a utility vehicle, the system comprising:
    a compressed air inlet coupleable to a compressor;
    a filter unit coupled to the compressed air inlet via a delivery line;
    a discharge valve element coupled to a discharge outlet and the delivery line;
    an energy saving control outlet coupleable to a control inlet of the compressor;
    a delivery line shut-off valve element interposed between the compressor and the filter unit;
    a first valve element and a second valve element, the discharge valve element, the energy saving control outlet, a regeneration of the filter unit and the delivery line shut-off valve element being controllable by the valve elements,
    wherein the energy saving control outlet and the delivery line shut-off valve element are controllable by the first valve element,
    wherein the discharge valve element and the regeneration of the filter unit are controllable by the second valve element,
    wherein the delivery line shut-off valve element is closed during a regeneration phase of the filter unit and is transferable to an opened control state outside the regeneration phase when the discharge valve element is closed and the energy saving control outlet is supplied with air, and
    wherein the compressed air supply system comprises a third valve element connected to a control inlet of the delivery line shut-off valve element for controlling the delivery line shut-off valve element.

2. The compressed air supply system as claimed in claim 1, wherein, in a first control state, the first valve element vents the energy saving control outlet, and, in a second control state, supplies the energy saving control outlet with air, and in that a compressor coupled to the energy saving control outlet can be transferred to an energy saving state by supplying the energy saving control outlet with air.

3. The compressed air supply system as claimed in claim 2, wherein, in a first control state, the second valve element vents a control inlet of the discharge valve element and a control inlet of the delivery line shut-off valve element, and blocks a regeneration air path, and, in a second control state, supplies air to the control inlet of the discharge valve element and the control inlet of the delivery line shut-off valve element and opens the regeneration air path, and in that the discharge valve element is closed when the control inlet is vented and open when the control inlet is supplied with air, and the delivery line shut-off valve element is open when the control inlet is vented and closed when the control inlet is supplied with air.

4. The compressed air supply system as claimed in claim 3, wherein, in a first operating state of the compressed air supply system, the first valve element assumes its first control state and the second valve element assumes its first control state, resulting in an operating state for delivery.

5. The compressed air supply system as claimed in claim 4, wherein, in a second operating state of the compressed air supply system, the first valve element assumes its second control state and the second valve element assumes its second control state, resulting in an operating state for regeneration.

6. The compressed air supply system as claimed in claim 5, wherein, in a third operating state of the compressed air supply system, the first valve element assumes its second control state and the second valve element assumes its first control state, resulting in a blocking operating state with an open delivery line shut-off valve element.

7. The compressed air supply system as claimed in claim 1, wherein, in a first control state, the first valve element vents the energy saving control outlet, and vents a first control inlet of the delivery line shut-off valve element, and, in a second control state, supplies the energy saving control outlet with air and supplies the first control inlet of the delivery line shut-off valve element with air, and in that a compressor coupled to the energy saving control outlet can be transferred to an energy saving state by supplying the energy saving control outlet with air, and the delivery line shut-off valve element is open when the first control inlet is vented and is closed under certain conditions when the first control inlet is supplied with air.

8. The compressed air supply system as claimed in claim 7, wherein, in a first control state, the second valve element vents a control inlet of the discharge valve element and blocks a regeneration air path, and, in a second control state, supplies the control inlet of the discharge valve element with air and opens the regeneration air path, and in that the discharge valve element is closed when the control inlet is vented and is opened when the control inlet is supplied with air.

9. The compressed air supply system as claimed in claim 8, wherein, in a first operating state of the compressed air supply system, the first valve element assumes its first control state and the second valve element assumes its first control state, resulting in an operating state for delivery.

10. The compressed air supply system as claimed in claim 9, wherein, in a second operating state of the compressed air supply system, the first valve element assumes its second control state and the second valve element assumes its second control state, resulting in an operating state for regeneration.

11. The compressed air supply system as claimed in claim 10, wherein, in a third operating state of the compressed air supply system, the first valve element assumes its second control state and the second valve element assumes its first control state, resulting in a blocking operating state.

12. The compressed air supply system as claimed in claim 11, wherein a third valve element is provided which, in a first control state, vents a second control inlet of the delivery line shut-off valve element and, in a second control state, supplies the second control inlet of the delivery line shut-off valve element with air, and in that the delivery line shut-off valve element is open when the second control inlet is supplied with air, even if the first control inlet of the delivery line shut-off valve element is supplied with air, with the result that, in the case of a third valve element, the system is in the blocking operating state with the delivery line shut-off valve element closed in the first control state and open in the second control state.

13. The compressed air supply system as claimed in claim 12, wherein, in a fourth operating state of the compressed air supply system, the first valve element assumes its first control state and the second valve element assumes its second control state, resulting in an operating state for purging.

14. The compressed air supply system as claimed in claim 13, wherein the third valve element is coupled to a control line, via which further control functions can be implemented in the compressed air supply system.

15. The compressed air supply system as claimed in claim 14, wherein the control line is connected to a control inlet of an overflow valve which supplies a consumer circuit.

16. The compressed air supply system as claimed in claim 15, wherein opening of the overflow valve is assisted by supplying air to the control inlet.

17. The compressed air supply system as claimed in claim 15, wherein a closed state of the overflow valve is brought about and maintained by supplying air to the control inlet.

18. The compressed air supply system as claimed in claim 1, wherein the valve elements are 3/2-way valves.

19. The compressed air supply system as claimed in claim 1, further comprising an electronic control unit, the valve elements being solenoid valves.

20. The compressed air supply system as claimed in claim 1, wherein the discharge valve element is a 2/2-way valve.

21. The compressed air supply system as claimed in claim 1, wherein the delivery line shut-off valve element is a 2/2-way valve.

22. A method for operating a compressed air supply system, the system comprising a compressed air inlet that is coupleable to a compressor, a filter unit that is coupled to the compressed air inlet via a delivery line, a discharge valve element that is coupled to a discharge outlet and the delivery line, an energy saving control outlet that is coupleable to a control inlet of the compressor, a delivery line shut-off valve element interposed between the compressor and the filter unit, a first valve element and a second valve element, the discharge valve element, the energy saving control outlet, the regeneration of the filter unit and the delivery line shut-off valve element being controllable by the valve elements, the method comprising the acts of:
 controlling the energy saving control outlet by the first valve element, and controlling the discharge valve element and regeneration of the filter unit by the second valve element; and
 closing the delivery line shut-off valve element during a regeneration phase of the filter unit and transferring the valve to an opened control state when not in the regeneration phase and when the discharge valve element is closed and the energy saving control outlet is supplied with air,
 wherein the compressed air supply system comprises a third valve element participating in the control of operating states of the compressed air supply system.

23. The method as claimed in claim 22, wherein the first valve element vents the energy saving control outlet in a first control state and supplies the energy saving control outlet with air in a second control state, and in that a compressor coupled to the energy saving control outlet can be transferred to an energy saving state by supplying the energy saving control outlet with air.

24. The method as claimed in claim 23, wherein, in a first control state, the second valve element vents a control inlet of the discharge valve element and a control inlet of the delivery line shut-off valve element and blocks a regeneration air path and, in a second control state, supplies the control inlet of the discharge valve element and the control inlet of the delivery line shut-off valve element with air and opens the regeneration air path, and in that the discharge valve element is closed when the control inlet is vented and is opened when the control inlet is supplied with air, and the delivery line shut-off valve element is opened when the control inlet is vented and closed when the control inlet is supplied with air.

25. The method as claimed in claim 24, wherein, in a first operating state of the compressed air supply system, the first valve element assumes its first control state and the second valve element assumes its first control state, resulting in an operating state for delivery.

26. The method as claimed in claim 25, wherein, in a second operating state of the compressed air supply system, the first valve element assumes its second control state and the second valve element assumes its second control state, resulting in an operating state for regeneration.

27. The method as claimed in claim 26, wherein, in a third operating state of the compressed air supply system, the first valve element assumes its second control state and the second valve element assumes its first control state, resulting in a blocking operating state with the delivery line shut-off valve element open.

28. The method as claimed in claim 22, wherein, in a first control state, the first valve element vents the energy saving control outlet, and vents a first control inlet of the delivery line shut-off valve element, and, in a second control state, supplies the energy saving control outlet with air and supplies the first control inlet of the delivery line shut-off valve element with air, and in that a compressor coupled to the energy saving control outlet can be transferred to an energy saving state by supplying the energy saving control outlet with air, and the delivery line shut-off valve element is open when the first control inlet is vented and is closed under certain conditions when the first control inlet is supplied with air.

29. The method as claimed in claim 28, wherein, in a first control state, the second valve element vents a control inlet of the discharge valve element and blocks a regeneration air path, and, in a second control state, supplies the control inlet of the discharge valve element with air and opens the regeneration air path, and in that the discharge valve element is closed when the control inlet is vented and is opened when the control inlet is supplied with air.

30. The method as claimed in claim 29, wherein, in a first operating state of the compressed air supply system, the first valve element assumes its first control state and the second valve element assumes its first control state, resulting in an operating state for delivery.

31. The method as claimed in claim 30, wherein, in a second operating state of the compressed air supply system, the first valve element assumes its second control state and the second valve element assumes its second control state, resulting in an operating state for regeneration.

32. The method as claimed in claim 31, wherein, in a third operating state of the compressed air supply system, the first valve element assumes its second control state and the second valve element assumes its first control state, resulting in a blocking operating state.

33. The method as claimed in claim 32, wherein a third valve element is provided which, in a first control state, vents a second control inlet of the delivery line shut-off valve element and, in a second control state, supplies the second control inlet of the delivery line shut-off valve element with air, and in that the delivery line shut-off valve element is open when the second control inlet is supplied with air, even if the first control inlet of the delivery line shut-off valve element is supplied with air, with the result that, in the case of a third valve element, the system is in the blocking operating state with the delivery line shut-off valve element closed in the first control state and open in the second control state.

34. The method as claimed in claim 33, wherein, in a fourth operating state of the compressed air supply system, the first valve element assumes its first control state and the second valve element assumes its second control state, resulting in an operating state for purging.

35. The method as claimed in claim 34, wherein the third valve element is coupled to a control line, via which further control functions can be implemented in the compressed air supply system.

36. The method as claimed in claim 35, wherein the control line is connected to a control inlet of an overflow valve which supplies a consumer circuit.

37. The method as claimed in claim 36, wherein opening of the overflow valve is assisted by supplying air to the control inlet.

38. The method as claimed in claim 36, wherein a closed state of the overflow valve is brought about and maintained by supplying air to the control inlet.

39. The method as claimed in claim 22, wherein the valve elements are activated by an electronic control unit.

* * * * *